United States Patent
Sugimoto et al.

(10) Patent No.: US 9,893,593 B2
(45) Date of Patent: Feb. 13, 2018

(54) ROTATING ELECTRIC MACHINE HAVING A COOLING FRAME WITH A PLURALITY OF COOLANTS

(71) Applicant: Hitachi, Ltd., Chiyoda-ku, Tokyo (JP)

(72) Inventors: Shinji Sugimoto, Tokyo (JP); Daisuke Kori, Tokyo (JP); Yuji Kanazawa, Tokyo (JP); Hirotaka Kinoshita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 498 days.

(21) Appl. No.: 14/598,794

(22) Filed: Jan. 16, 2015

(65) Prior Publication Data

US 2015/0207388 A1 Jul. 23, 2015

(30) Foreign Application Priority Data

Jan. 20, 2014 (JP) ................................. 2014-007411

(51) Int. Cl.
| | |
|---|---|
| *H02K 9/20* | (2006.01) |
| *H02K 9/00* | (2006.01) |
| *H02K 9/06* | (2006.01) |
| *H02K 9/197* | (2006.01) |
| *H02K 5/20* | (2006.01) |

(Continued)

(52) U.S. Cl.
CPC ............... *H02K 9/197* (2013.01); *H02K 5/20* (2013.01); *H02K 9/08* (2013.01); *H02K 9/19* (2013.01)

(58) Field of Classification Search
CPC .................................. H02K 9/19; H02K 5/10

USPC ................... 310/52, 54, 56, 58, 59, 64
See application file for complete search history.

(56) References Cited

U.S. PATENT DOCUMENTS

| | | | |
|---|---|---|---|
| 5,859,482 | A | 1/1999 | Crowell et al. |
| 2012/0305226 | A1 | 12/2012 | Chamberlin et al. |
| 2013/0126143 | A1 | 5/2013 | Sheu et al. |

(Continued)

FOREIGN PATENT DOCUMENTS

| | | |
|---|---|---|
| JP | 6-70507 A | 3/1994 |
| JP | 7-872 B2 | 1/1995 |

(Continued)

OTHER PUBLICATIONS

Extended European Search Report issued in counterpart European Application No. 15000110.5 dated Mar. 31, 2016 (Eight (8) pages).

(Continued)

*Primary Examiner* — Jose Gonzalez Quinones
(74) *Attorney, Agent, or Firm* — Crowell & Moring LLP

(57) ABSTRACT

A rotating electric machine includes a cooling frame. The cooling frame includes a flow passage through which the first liquid coolant circulates, a flow inlet connected to one end of the flow passage so as to make the first liquid coolant flow from the outside into the flow passage, and a flow outlet connected to the other end of the flow passage so as to make the first liquid coolant having flown through the flow passage flow to the outside. The machine is configured that, when the flow passage is divided into a front half portion closer to the flow inlet and a latter half portion closer to the flow outlet, the front half portion becomes a portion where the first liquid coolant mainly cools the second liquid coolant, and the latter half portion becomes a portion where the first liquid coolant mainly cools the gas coolant.

17 Claims, 9 Drawing Sheets

(51) Int. Cl.
*H02K 9/08* (2006.01)
*H02K 9/19* (2006.01)

(56) References Cited

U.S. PATENT DOCUMENTS

| | | |
|---|---|---|
| 2014/0127050 A1 | 5/2014 | Oda et al. |
| 2014/0217842 A1 | 8/2014 | Kikuchi et al. |

FOREIGN PATENT DOCUMENTS

| | | | | |
|---|---|---|---|---|
| JP | 09046974 A | * | 2/1997 | |
| JP | 10-155257 A | | 6/1998 | |
| JP | 2007020333 A | * | 1/2007 | |
| JP | 2010-93984 A | | 4/2010 | |
| JP | 2012-191718 A | | 10/2012 | |
| JP | 2012-191719 A | | 10/2012 | |
| JP | 2013-66348 A | | 4/2013 | |
| JP | 2013-162674 A | | 8/2013 | |
| JP | 2013162674 A | * | 8/2013 | |
| WO | WO 2013/ 011939 A1 | | 1/2013 | |

OTHER PUBLICATIONS

Japanese Office Action issued in counterpart Japanese Application No. 2014-007411 dated Jun. 13, 2017 with unverified English translation (14 pages).

* cited by examiner

ROTATING ELECTRIC MACHINE HAVING A COOLING FRAME WITH A PLURALITY OF COOLANTS

BACKGROUND OF THE INVENTION

The present invention relates to a rotating electric machine configured to include a stator and a rotor, and relates more specifically to a multi-coolant type rotating electric machine having a structure of cooling the rotating electric machine using plural kinds of coolant.

In the past, as a rotating electric machine having a structure of cooling the rotating electric machine using two kinds of liquid coolant A and B and employing a cooling method of reserving the liquid coolant B inside the rotating electric machine and cooling the inside of the rotating electric machine, there was one strengthening the cooling capacity by arranging a flow passage for circulating the liquid coolant A through a bracket that was a frame of the end section of the rotating electric machine (refer to JP-A-2012-191718 for example).

Also, in the past, as a rotating electric machine employing a cooling method of reserving the liquid coolant B in the inside of the rotating electric machine and cooling the inside of the rotating electric machine in a similar manner, there was one strengthening the cooling capacity by lifting the liquid coolant B inside the rotating electric machine by pumps arranged on a shall disposed on the inner circumference side of the rotor to the upper part inside the rotating electric machine for cooling (refer to JP-A-2012-191719 for example).

Also, in the past, as a rotating electric machine employing a cooling method of reserving the liquid coolant B in the inside of the rotating electric machine and cooling the inside of the rotating electric machine in a similar manner, there was one strengthening the cooling capacity by disposing a pump formed of a vane member in a bracket that was a frame in the end section of the rotating electric machine, rotating the pump by the flow of the cooling water of the liquid coolant A, and lifting the liquid coolant B inside the rotating electric machine to the upper part inside the rotating electric machine for cooling (refer to JP-A-2013-162674 for example).

In general, as a method for introducing a liquid coolant into a machine for cooling in a rotating electric machine, there are three methods as described below.
(1) A method for cooling the surface outside the rotating electric machine by arranging a pump A arranged outside the rotating electric machine and a cooler A cooling the liquid coolant A circulated through a cooling frame formed on the surface outside the rotating electric machine, and circulating the liquid coolant A cooled by the cooler A through the cooling frame by the pump A.
(2) A method for cooling the inside of the rotating electric machine by arranging a pump B arranged outside the rotating electric machine and a cooler B cooling the liquid coolant B circulated through the inside of the rotating electric machine, and circulating the liquid coolant B cooled by the cooler B through the inside of the rotating electric machine by the pump B.
(3) A method for cooling the surface outside the rotating electric machine and the inside of the rotating electric machine by using both methods of (1) and (2) simultaneously.

When the cooling method of (1) is called "oil cooling", the cooling method of (2) is called "water cooling", and the cooling method of (3) is called "cooling by both oil cooling and water cooling", each of them has the features as described below in general.

Water cooling is a cooling method for cooling a heat generation source such as a conduction loss generated when electric current is made to pass through a stator coil inside a rotating electric machine, an iron loss generated by that the magnetic flux passes through a stator core, and so on through the stator core, and cooling can be strengthened more compared to air cooling in which cooling is performed by a gas coolant inside the rotating electric machine.

With respect to oil cooling, because a heat generation source such as a conduction loss generated when electric current is made to pass through a stator coil inside the rotating electric machine, an iron loss generated by that the magnetic flux passes through the stator core, and so on is directly cooled, cooling can be strengthened compared to water cooling.

Because cooling by both oil cooling and water cooling uses both of oil cooling and water cooling simultaneously, cooling of the inside of the rotating electric machine by oil cooling and cooling of the surface outside the rotating electric machine by water cooling can be performed, and therefore cooling can be strengthened compared to water cooling and oil cooling. On the other hand, in codling by both oil cooling and water cooling, there is a problem that the system becomes large because the pump A and the pump B are required.

In order to solve the problem, cooling methods of reserving the liquid coolant B in the inside of the rotating electric machine and cooling the inside of the rotating electric machine have been disclosed in JP-A-2012-191718, JP-A-2012-491719, and JP-A-2013-162674. According to the cooling method disclosed in JP-A-2012-191718, it is characterized that a flow passage for circulating the liquid coolant A through a bracket that is a frame in the end section of the rotating electric machine is arranged, and cooling is strengthened. According to the cooling method disclosed in JP-A-2012-191719, it is characterized that the liquid coolant B inside the rotating electric machine is lifted by pumps arranged on a shaft disposed on the inner circumference side of the rotor to the upper part in the inside of the rotating electric machine for cooling, and cooling is strengthened. According to the cooling method disclosed in JP-A-2013-162674, it is characterized that a pump formed of a vane member is disposed in a bracket that is a frame in the end section of the rotating electric machine, the pump is rotated by the flow of the cooling water of the liquid coolant A, and the liquid coolant B inside the rotating electric machine is lifted to the upper part of the inside of the rotating electric machine for cooling, and cooling is strengthened.

However, according to the configuration described in JP-A-2012-191718, because it is configured that the liquid coolant is circulated through the bracket also, there is a problem that the structure of the bracket becomes complicated and the cost increases. Also, according to the configuration described in JP-A-2012-191719, there is a problem that the rotating electric machine becomes large by the pumps arranged on the shaft. Further, according to the configuration described in JP-A-2013-162674, although it is configured that the liquid coolant B inside the rotating electric machine is lifted to the upper part in the inside of the rotating electric machine by the pump formed in the bracket, because the flow passage of the liquid coolant B is the bracket, there is a problem that the bracket becomes complicated and the cost increases.

SUMMARY OF THE INVENTION

The object of the present invention is to solve the problems of the prior arts described above and to provide a rotating electric machine that strengthens cooling.

In order to solve the problems, the rotating electric machine of an aspect of the present invention is a rotating electric machine 1 including a stator, and a rotor disposed so as to oppose the stator through a gap, in which the stator 2 includes a stator core and stator coils wound around the stator core, the stator core includes a plurality of teeth cores projected in the radial direction from an annular yoke core and slots located between the plurality of teeth cores and accommodating the stator coils, the rotor includes a rotor core rotatably held, the rotating electric machine further includes a cooling frame that makes a first liquid coolant circulate therethrough and cools the inside of the rotating electric machine, and has a structure of cooling the inside of the rotating electric machine by a second liquid coolant sealed in the inside of the rotating electric machine and a gas coolant sealed in the inside of the rotating electric machine, and cooling the second liquid coolant and the gas coolant by the cooling frame, the cooling frame includes a flow passage through which the first liquid coolant circulates, a flow inlet connected to one end of the flow passage so as to make the first liquid coolant flow from the outside into the flow passage, and a flow outlet connected to the other end of the flow passage so as to make the first liquid coolant having flown through the flow passage flow to the outside, and the rotating electric machine is configured that, when the entirety in the length direction of the flow passage is divided to a front half portion closer to the flow inlet and a latter half portion closer to the flow outlet, the front half portion becomes a portion where the first liquid coolant mainly cook the second liquid coolant, and the latter half portion becomes a portion where the first liquid coolant mainly cools the gas coolant.

The present invention can improve the cooling performance of the rotating electric machine, and can thereby contribute to miniaturization of the rotating electric machine.

Other objects, features and advantages of the invention will become apparent from the following description of the embodiments of the invention taken in conjunction with the accompanying drawings.

DETAILED DESCRIPTION OF THE EMBODIMENTS

Figure 1:
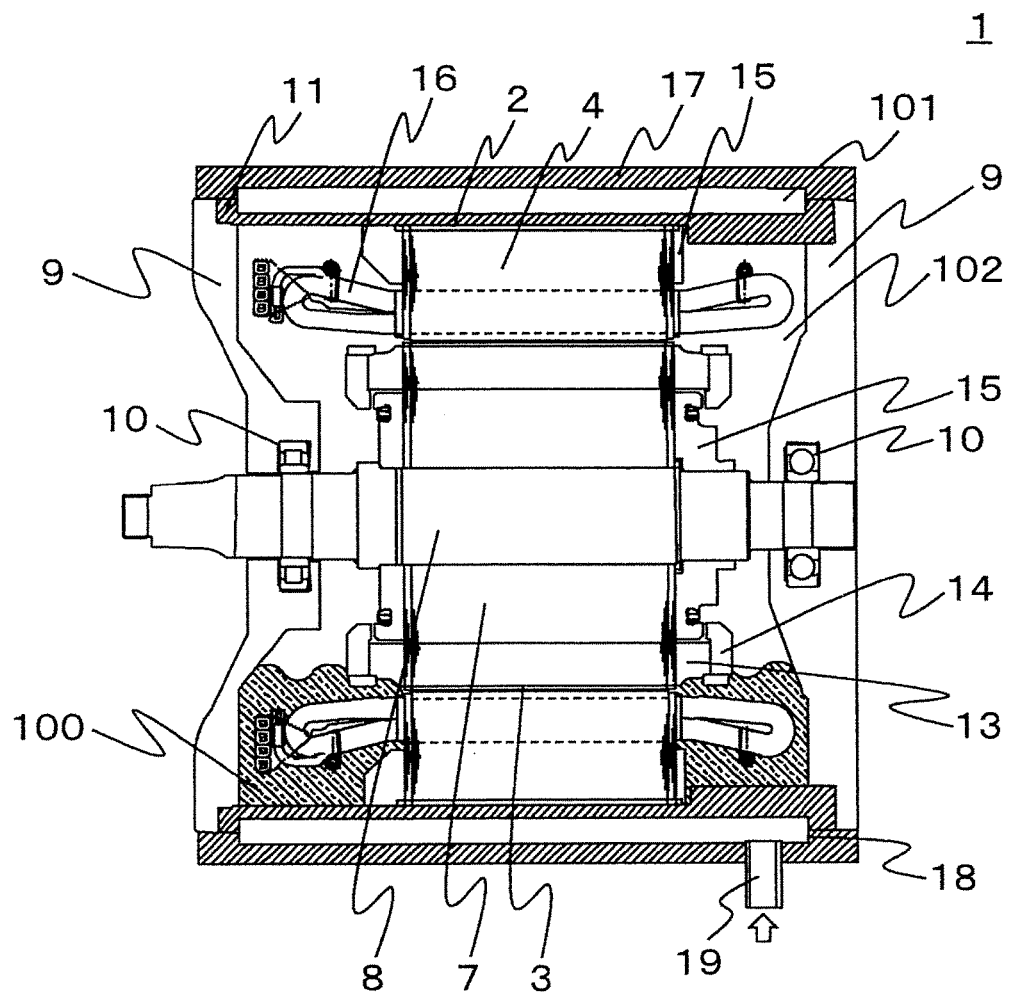
FIG. 1 is a sectional view in the axial direction of a rotating electric machine of the embodiment 1 of the present invention.

The rotating electric machine of an aspect of the present invention is a rotating electric machine including a stator having a stator core around which stator coils are wound and a rotor having a rotor core rotatably held in the inner circumference of the stator, and further includes a cooling frame that makes a first liquid coolant circulate therethrough and cools the inside of the rotating electric machine and a second liquid coolant and a gas coolant sealed in the inside of the machine. The cooling frame includes a flow passage through which the first liquid coolant circulates, and a flow inlet for making the first liquid coolant flow from the outside into the flow passage and a flow outlet for making the first liquid coolant having flown through the flow passage flow to the outside are connected to the flow passage. The rotating electric machine of an aspect of the present invention is configured that, when the entirety in the longitudinal direction of the flow passage is divided into a front half portion closer to the flow inlet and a latter half portion closer to the flow outlet, the front half portion becomes a portion where the first liquid coolant mainly cools the second liquid coolant, and the latter half portion becomes a portion where the first liquid coolant mainly cools the gas coolant.

With such configuration, effective cooling of the second liquid coolant inside the rotating electric machine becomes possible, improvement of the cooling performance of the rotating electric machine thereby becomes possible, and miniaturization of the rotating electric machine becomes possible.

Below, each embodiment of the present invention will be described in detail referring to the drawings.

Embodiment 1

Embodiment 1 that is the first aspect of the present invention will be described based on FIG. 1 and FIG. 2.

Figure 2:
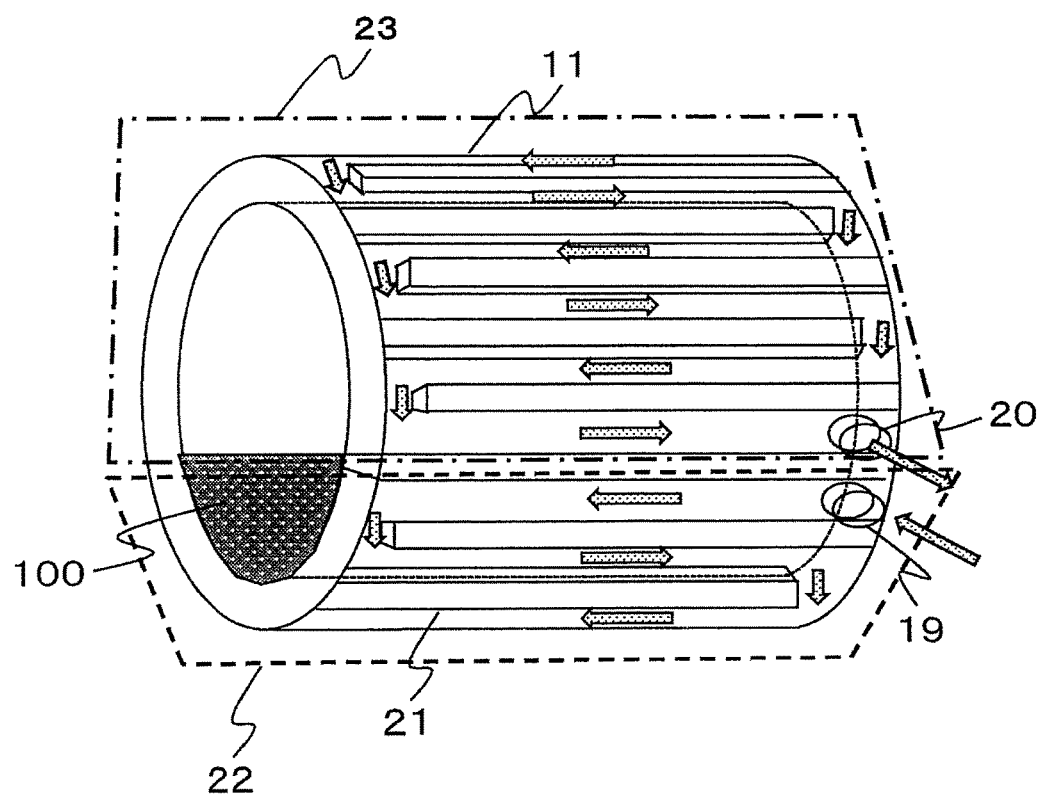
FIG. 2 is a perspective view of a housing in the rotating electric machine of the embodiment 1 of the present invention.

FIG. 1 is a sectional view in the axial direction of a rotating electric machine 1 of the present embodiment. Also, FIG. 1 represents a case the rotating electric machine 1 is an induction motor.

A stator 2 of the rotating electric machine 1 is formed of a stator core 4, stator coils 5 of multi-phases wound around the stator core 4, a housing 11 holding the stator core 4 with its inner circumference surface, and a cooling frame 17 disposed on the outer circumference side of the housing 11. A rotor 3 is formed of a rotor core 7, a shaft 8, bearings 10, bars 13, end rings 14, and endplates 15, and the bars 13 are disposed inside the rotor core in the axial direction. The bearings 10 are supported by end brackets 9, and are held rotatably. The end brackets 9 are fixed to the housing 11. The rotor 3 rotates clockwise and counterclockwise, and is to be operated as a motor.

Also, inside the rotating electric machine 1, a gas coolant 102 formed of air and a liquid coolant 100 are sealed, and this sealed liquid coolant 100 is lifted to the upper part of the inside of the rotating electric machine 1 by rotation of the bars 13 and the end rings 14.

The cooling frame 17 includes a flow inlet 19 making the liquid coolant 101 flow in, and a flow outlet 20 making the liquid coolant 101 flow out. A flow passage 18 through which a liquid coolant 101 flows formed by the housing 11 is formed between the housing 11 and the cooling frame 17, and is formed so that the liquid coolant 101 flows in the axial direction of the rotor. Also, it is configured that the length in the axial direction of the flow passage becomes longer than the length in the axial direction of the stator core 4.

Next, the heat generation source of the rotating electric machine 1 will be described using FIG. 1. In the rotating electric machine 1, by energizing and rotating the rotating electric machine 1, a primary copper loss, a secondary copper loss, an iron loss, and a mechanical loss are generated. The primary copper loss is a conduction loss generated by energizing the stator coils 5. Generation of the secondary copper loss will be described. The magnetic flux formed by the stator 2 flows inside the rotor 3. Toward the direction of cancelling this magnetic flux, an induced electromotive voltage is generated in the bars 13 and the end rings 14 disposed inside the rotor 3. The secondary copper loss is a conduction loss generated by that the electric current flows through the bars 13 and the end rings 14. With respect to the iron loss, by energizing the stator coils 5, the magnetic flux is generated in the stator core 4, and the iron loss is generated in the stator core 4 by temporal change of the flux. The mechanical loss is a loss generated by friction inside the bearings when the rotor 3 rotates and the bearings 10 also rotate simultaneously by rotation of the rotor 3. Because of these losses, the rotating electric machine 1 is heated.

Next, the configuration for cooling the rotating electric machine 1 will be described using FIG. 1. The liquid coolant 100 inside the rotating electric machine 1 cools coil ends 16 of the stator coil 5 and the stator core 4 immersed in the liquid coolant 100. Further, the liquid coolant 100 rotates the bars 13 and the end rings 14 also by rotation of the rotor 3. At this time, the liquid coolant 100 is lifted to the upper part of the rotating electric machine 1 by the bars 13 and the end rings 14, and cools the coil ends 16 and the stator core 4 which are not immersed in the liquid coolant 100. Further, the liquid coolant 100 cools the rotor 3 also when the rotor 3 is immersed. The liquid coolant 101 flowing through the flow passage 18 of the cooling frame cools the stator core 4 and the liquid coolant 100 reserved inside the rotating electric machine 1 through a process of flowing in from the flow inlet 19, flowing inside the cooling frame 17, and reaching the flow outlet 20.

Next, the flow of the liquid coolant 101 inside the cooling frame will be described using FIG. 2. Also, FIG. 2 is a drawing showing the housing 11, and illustration of the stator 2, the rotor 3, and the cooling frame 17 is omitted in the drawing. A flow passage wall 21 is formed in the housing 17, and the flow passage of the liquid coolant 101 is formed by this flow passage wall 21. In the present embodiment, because this flow passage wall 21 is formed generally parallel to the direction of the rotation axis of the rotating electric machine 1, the liquid coolant 101 having flown in from the flow inlet 19 of the liquid coolant 101 flows in the direction of the rotation axis of the rotating electric machine 1. It is configured that the liquid coolant 101 repeats to turn round at the end sections of the housing 11, goes round in the circumferential direction of the rotating electric machine 1, and flows to the outside of the rotating electric machine 1 at the flow outlet 20 of the liquid coolant 101. Also, the housing 11 is divided into a portion 22 that cools the liquid coolant 100 and the stator core 4 and a portion 23 that cools the gas coolant and the stator core 4. When the flow passage is divided into a portion closer to the flow inlet 19 and a portion closer to the flow outlet 20, to the portion 22 of the housing 11, the portion closer to the flow inlet 19 of the flow passage which is a portion of the front half when the flow passage is viewed along the direction the liquid coolant 101 flows is disposed, and the portion becomes a portion that mainly cools the liquid coolant 100. On the other hand, to the portion 23 of the housing 11, the portion closer to the flow outlet 20 of the flow passage which is a portion of the latter half when the flow passage is viewed along the direction the liquid coolant 101 flows is disposed, and the portion becomes a portion that mainly cools the gas coolant. The cooling frame in an aspect of the present invention is configured thus.

Here, there are three feature points. The first feature point is that, to the portion 22 of the housing 11, the flow inlet 19 side of the flow passage which is the front half portion is disposed, and the front half portion becomes a portion that mainly cools the liquid coolant 100, whereas to the portion 23 of the housing 11, the flow outlet 20 side of the flow passage which is the latter half portion is disposed, and the latter half portion becomes a portion that mainly cools the gas coolant. Thus, because the temperature of the liquid coolant 101 flowing in to the inside of the housing 11 is lower as the position is closer to the flow inlet, the liquid coolant 100 sealed inside the rotating electric machine 1 can be effectively cooled, cooling of the rotating electric machine 1 can be strengthened, and the rotating electric machine 1 can be miniaturized.

The second feature point is that the direction of the flow passage 18 formed in the housing 11 is generally parallel to the direction of the rotation axis of the rotating electric machine 1. Thus, because the number of times of turning round becomes less compared to a case the direction of the flow passage 18 is generally parallel to the circumferential direction of the rotating electric machine 1, the pressure loss inside the housing 11 reduces. Thus, because the flow rate of the liquid coolant 101 increases, cooling of the rotating electric machine 1 can be strengthened, and the rotating electric machine 1 can be miniaturized.

The third feature point is that it is configured that the length in the axial direction of the flow passage 18 formed in the housing 11 becomes longer than the length in the axial direction of the stator core 4. Thus, because the liquid coolant 100 sealed in the inside of the rotating electric machine 1 can be effectively cooled by the flow passage 18 that makes the liquid coolant 101 circulate, cooling of the rotating electric machine 1 can be strengthened, and the rotating electric machine 1 can be miniaturized.

In short, according to the present embodiment, cooling of the rotating electric machine 1 can be strengthened, and the rotating electric machine 1 can be miniaturized.

Embodiment 2

Next, Embodiment 2 that is the second aspect of the present invention will be described using FIG. 3.

Figure 3:
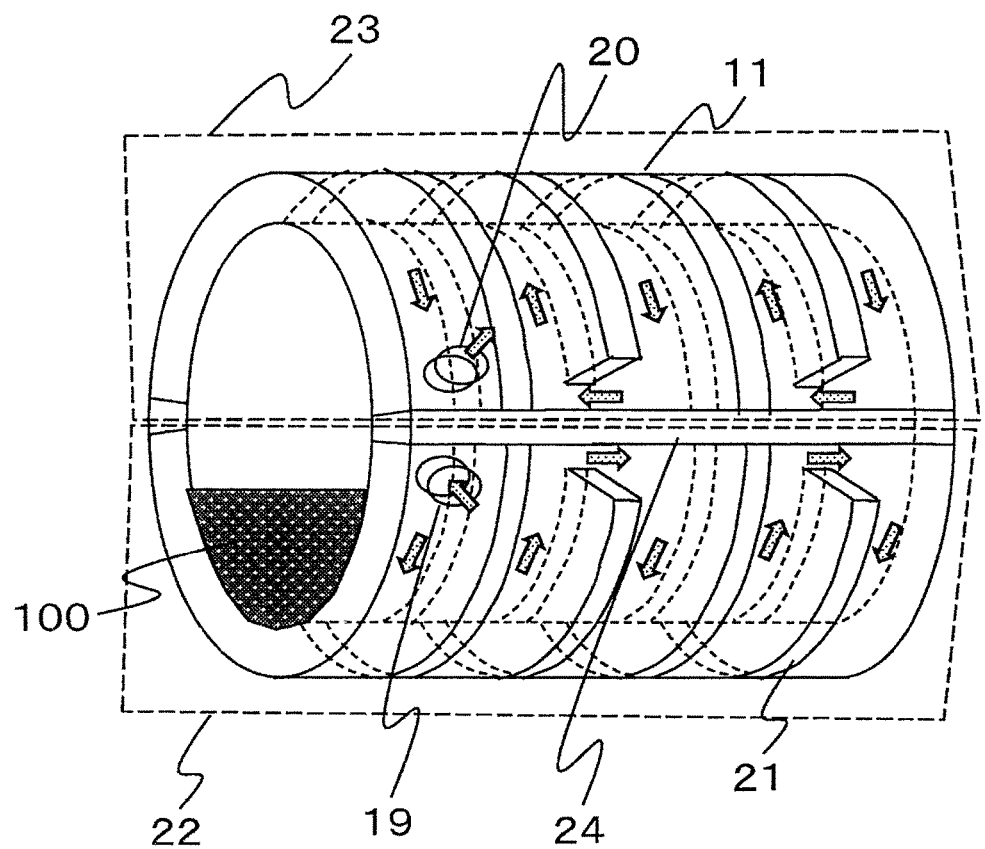
FIG. 3 is a perspective view of a housing in a rotating electric machine of the embodiment 2 of the present invention.

FIG. 3 is a drawing showing the housing 11 of the present embodiment, and illustration of the stator 2, the rotor 3, and the cooling frame 17 is omitted in the drawing. The point different from FIG. 2 is that the direction of the flow passage 18 formed in the housing 11 is generally parallel to the circumferential direction of the rotating electric machine 1.

In the present embodiment, because this flow passage wall 21 is formed generally parallel to the circumferential direction of the rotating electric machine 1, the liquid coolant 101 having flown in from the flow inlet 19 of the liquid coolant 101 flows in the circumferential direction of the rotating electric machine 1. The liquid coolant 101 repeats to turn round at a turning round flow passage wall 24 formed in the housing 11, flows in the axial direction of the rotating electric machine 1, and flows to the flow passage 18 in the part upper than the turning round flow passage wall 24 of the rotating electric machine 1 at the end section in the axial direction of the rotating electric machine 1. Also, it is configured that the liquid coolant 101 flows in the circumferential direction, turns round at the turning round flow passage wall 24, flows to the end section in the axial direction of the rotating electric machine 1, and is made to flow out from the flow outlet 20 of the liquid coolant 101.

According to the present embodiment, because it is configured that the flow inlet side and the flow outlet side of the flow passage 18 of the liquid coolant 101 are adjacent to each other, the temperature at the flow inlet side and the flow outlet side of the liquid coolant 101 is equalized, thereby the temperature inside the rotating electric machine 1 can be equalized, thereby imbalance of the resistance value of the stator coils 5 among respective phases becomes less, and thereby drop of the output of the rotating electric machine 1 can be suppressed.

Embodiment 3

Next, Embodiment 3 that is the third aspect of the present invention will be described using FIG. 4.

Figure 4:
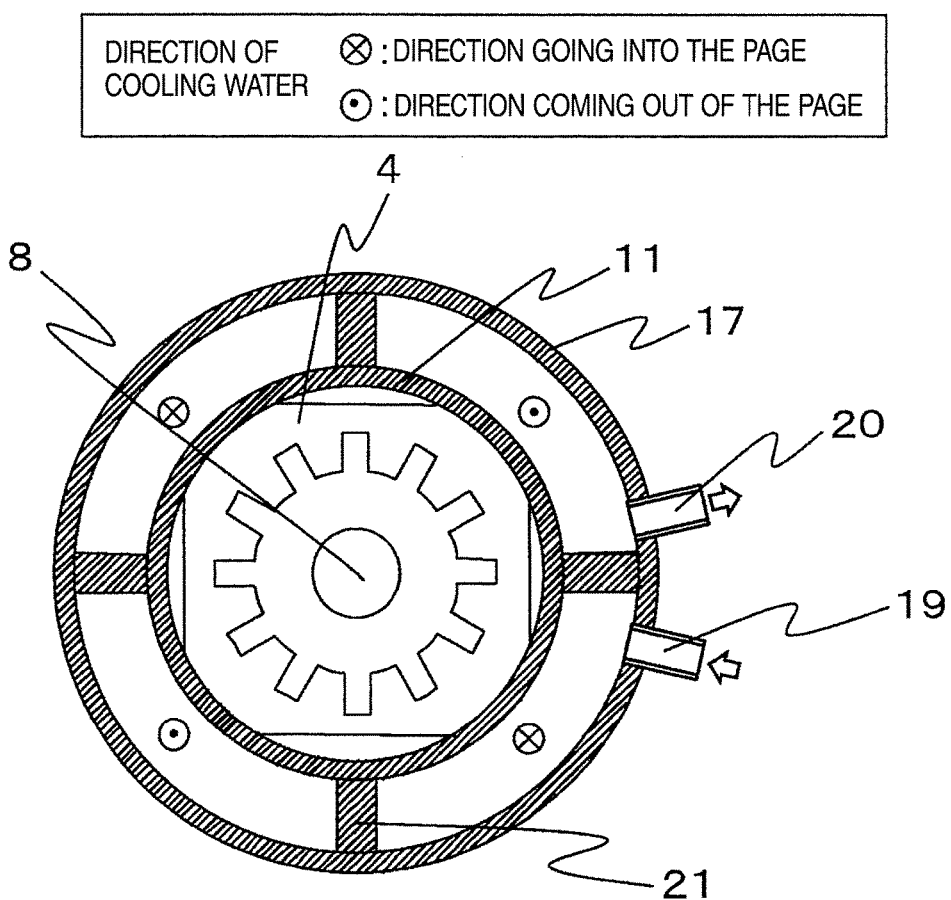
FIG. 4 is a sectional view in the circumferential direction of a rotating electric machine of the embodiment 3 of the present invention.

FIG. 4 is a sectional view in the circumferential direction of the housing 11 of the present embodiment. Also, in FIG. 4, illustration of the stator coils 5 and the rotor 3 is omitted. Here, the feature point is that the flow passage wall 21 of the housing 11 is formed in a portion the stator core 4 and the housing 11 do not contact each other.

According to the present embodiment, because the flow passage wall 21 is formed in a portion the stator core 4 and the housing 11 do not contact each other, the area for heat conduction from the stator core 4 to the housing 11 can be effectively utilized, and therefore the stator core 4 can be more effectively cooled compared to a case the flow passage wall 21 is formed in a portion the stator core 4 and the housing 11 contact each other. Thus, cooling of the rotating electric machine 1 can be strengthened, and therefore the rotating electric machine 1 can be miniaturized.

Embodiment 4

Next, Embodiment 4 that is the fourth aspect of the present invention will be described using FIG. 5.

Figure 5:
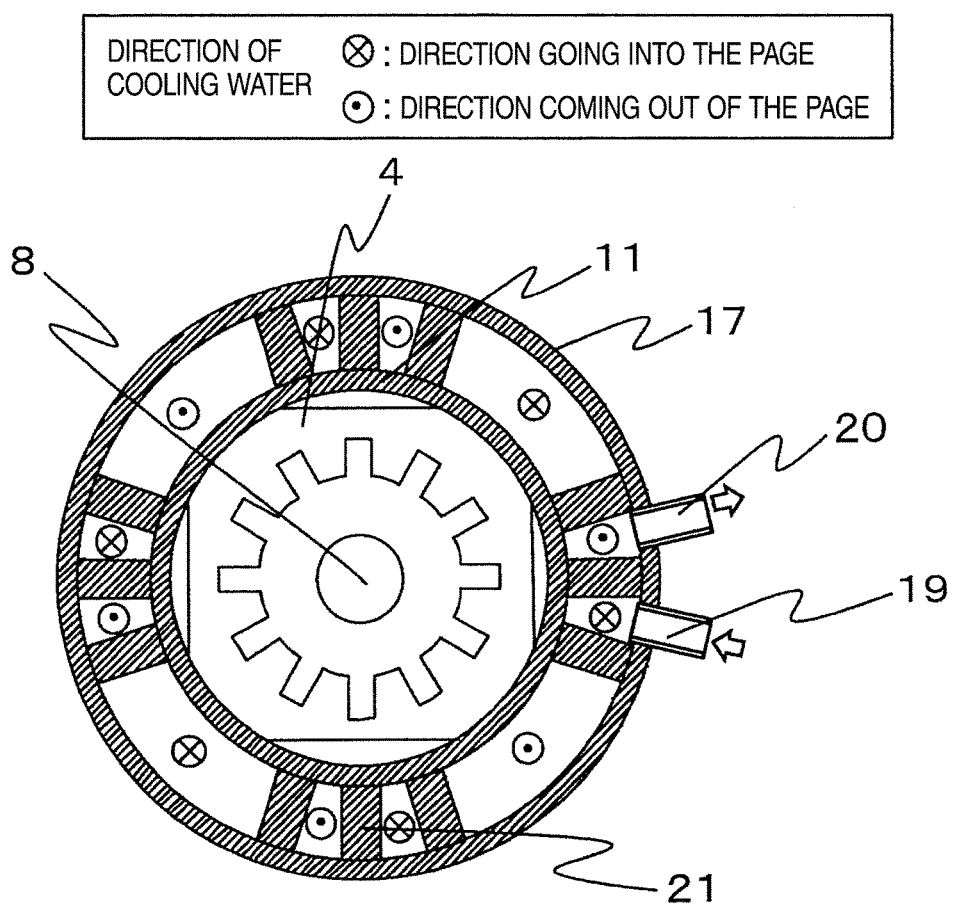
FIG. 5 is a sectional view in the circumferential direction of a rotating electric machine of the embodiment 4 of the present invention.

FIG. 5 is a sectional view in the circumferential direction of the housing 11 of the present embodiment. Also, in FIG. 5, illustration of the stator coils 5 and the rotor 3 is omitted. The point different from FIG. 4 is that the interval of the flow passage wall 21 and the adjacent flow passage wall formed in the housing 11 is unequal interval.

According to the present embodiment, because the contact area of the housing 11 and the liquid coolant 101 can be enlarged while effectively utilizing the area for heat conduction from the stator core 4 to the housing 11 because the flow passage wall 21 is formed in a portion the stator core 4 and the housing 11 do not contact each other, the cooling capacity of the housing 11 can be improved, thereby cooling of the rotating electric machine 1 can be strengthened, and therefore the rotating electric machine can be miniaturized.

Embodiment 5

Next, Embodiment 5 that is the fifth aspect of the present invention will be described using FIG. 6.

Figure 6:
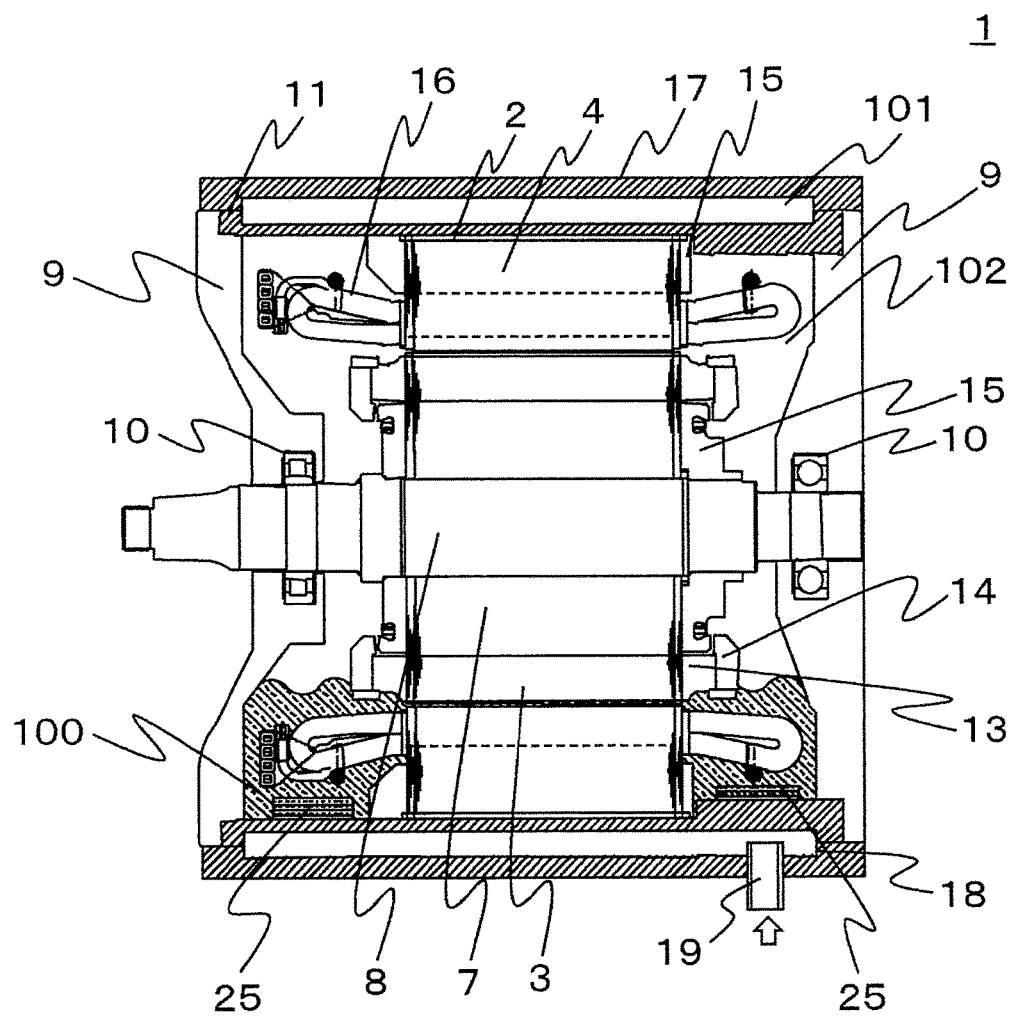
FIG. 6 is a sectional view in the axial direction of a rotating electric machine of the embodiment 5 of the present invention.

FIG. 6 is a sectional view in the axial direction of the rotating electric machine 1 of the present embodiment. Here, the point different from FIG. 1 is that fins 25 are arranged on the inside diameter side of the housing 11.

According to the present embodiment, because the area on the inside diameter side of the housing 11 can be enlarged, the heat removal amount of the liquid coolant 100 by the liquid coolant 101 can be increased, and therefore the temperature of the liquid coolant 100 can be lowered. Thus, cooling of the inside of the rotating electric machine 1 can be strengthened, and therefore the rotating electric machine can be miniaturized.

Embodiment 6

Next, Embodiment 6 that is the sixth aspect of the present invention will be described using FIG. 7.

Figure 7:
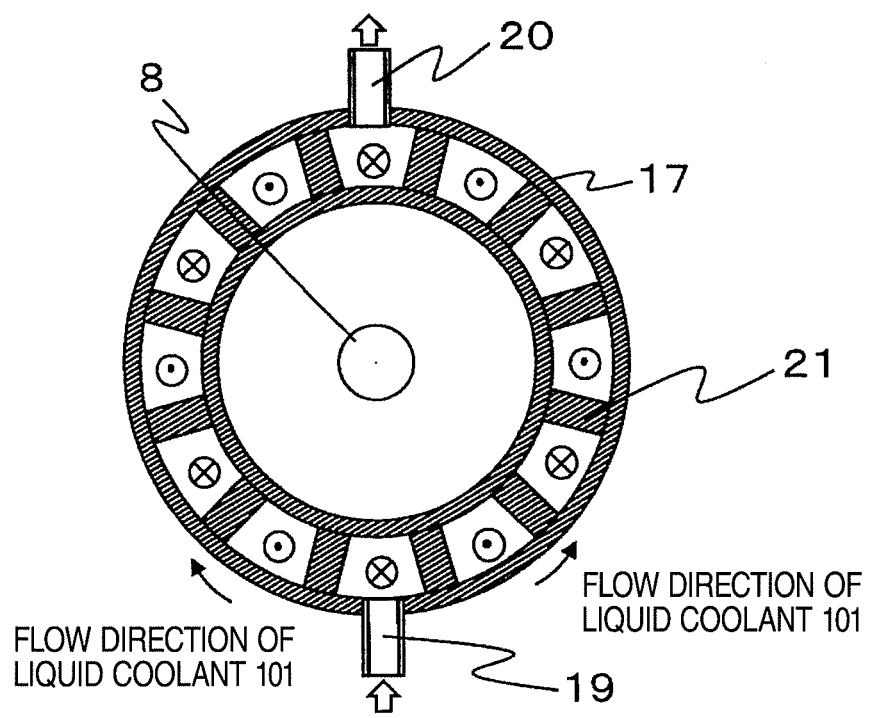
FIG. 7 is a sectional view in the circumferential direction of a housing in a rotating electric machine of the embodiment 6 of the present invention.

FIG. 7 is a sectional view in the circumferential direction of the rotating electric machine 1 of the present embodiment. Also, FIG. 7 is a drawing showing the housing 11 and the cooling frame 17, and illustration of the stator 2 and the rotor 3 is omitted in the drawing. The liquid coolant 101 having flown in from the flow inlet 19 flows in the axial direction of the rotating electric machine 1 by the flow passage wall 21 formed in the housing 11 in the axial direction of the rotating electric machine 1. Also, the liquid coolant 101 repeats to turn round after reaching the end section in the axial direction of the housing 11, and flows in the circumferential direction. In the present embodiment, it is configured that the liquid coolant 101 having flown in from the flow inlet 19 flows dividedly into two flow passages toward the flow outlet 20.

According to the present embodiment, because the temperature of the liquid coolant 101 flowing in to the inside of the housing 11 is lower as the position is closer to the flow inlet, the liquid coolant 100 can be effectively cooled by enlarging the area of the contact part of a flow passage portion where the temperature of the liquid coolant 101 is low and the liquid coolant 100, cooling of the inside of the rotating electric machine 1 can be strengthened, and the rotating electric machine 1 can be miniaturized.

Embodiment 7

Next, Embodiment 7 that is the seventh aspect of the present invention will be described using FIG. 8.

Figure 8:
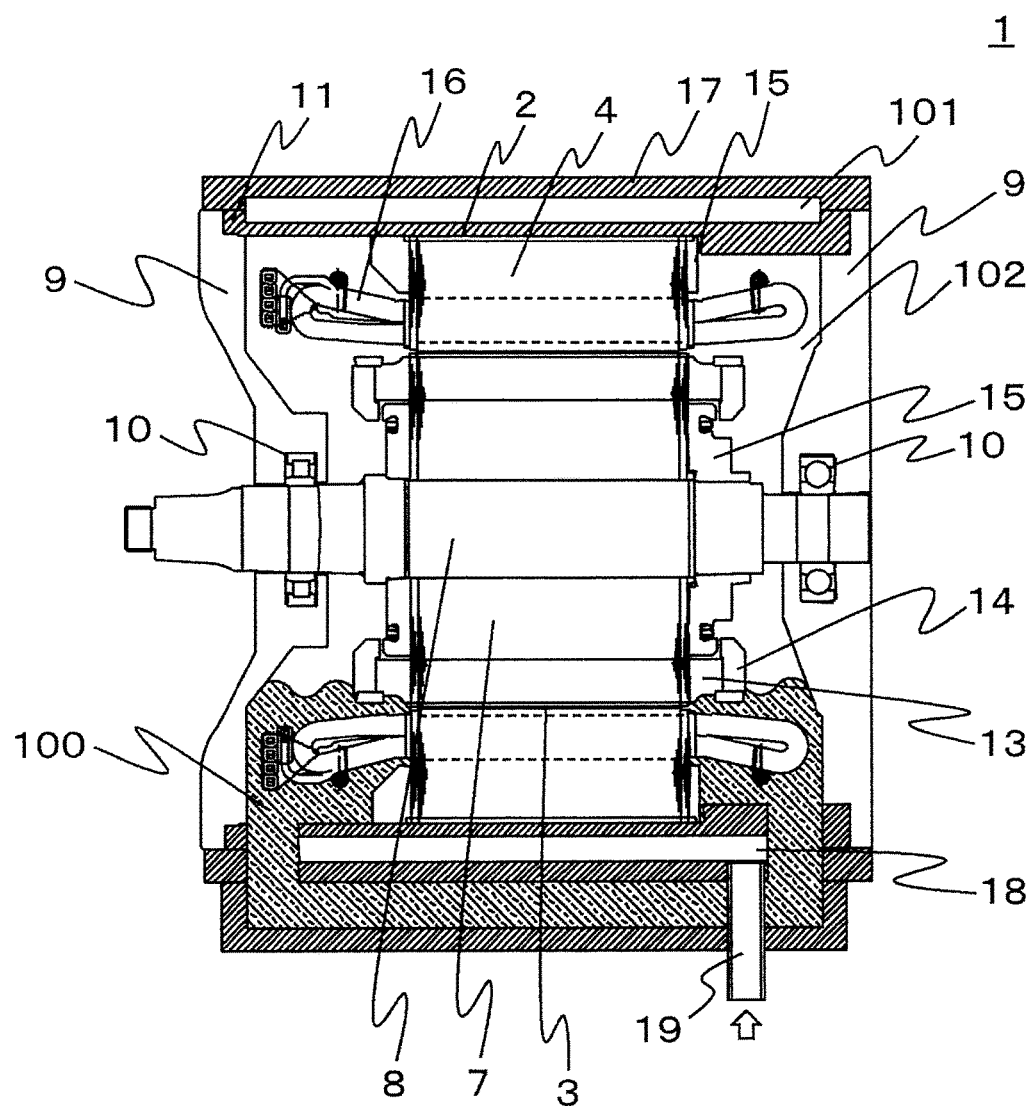
FIG. 8 is a sectional view in the axial direction of a rotating electric machine of the embodiment 7 of the present invention.

FIG. 8 is a sectional view in the axial direction of the rotating electric machine 1 of the present embodiment. Here, the point different from FIG. 1 is that a reservoir 26 for the liquid coolant 100 is arranged on the outside diameter side of the housing 11. Also, this reservoir 26 is disposed in the lower part of the rotating electric machine 1 to which direction the gravity is applied.

According to the present embodiment, because the reservoir 26 is arranged, the area of the housing 11 cooling the liquid coolant 100 increases, and thereby the temperature of the liquid coolant 100 can be lowered. Thus, cooling of the inside of the rotating electric machine 1 can be strengthened, and therefore the rotating electric machine 1 can be miniaturized.

Embodiment 8

Next, Embodiment 8 that is the eighth aspect of the present invention will be described using FIG. 9.

Figure 9:
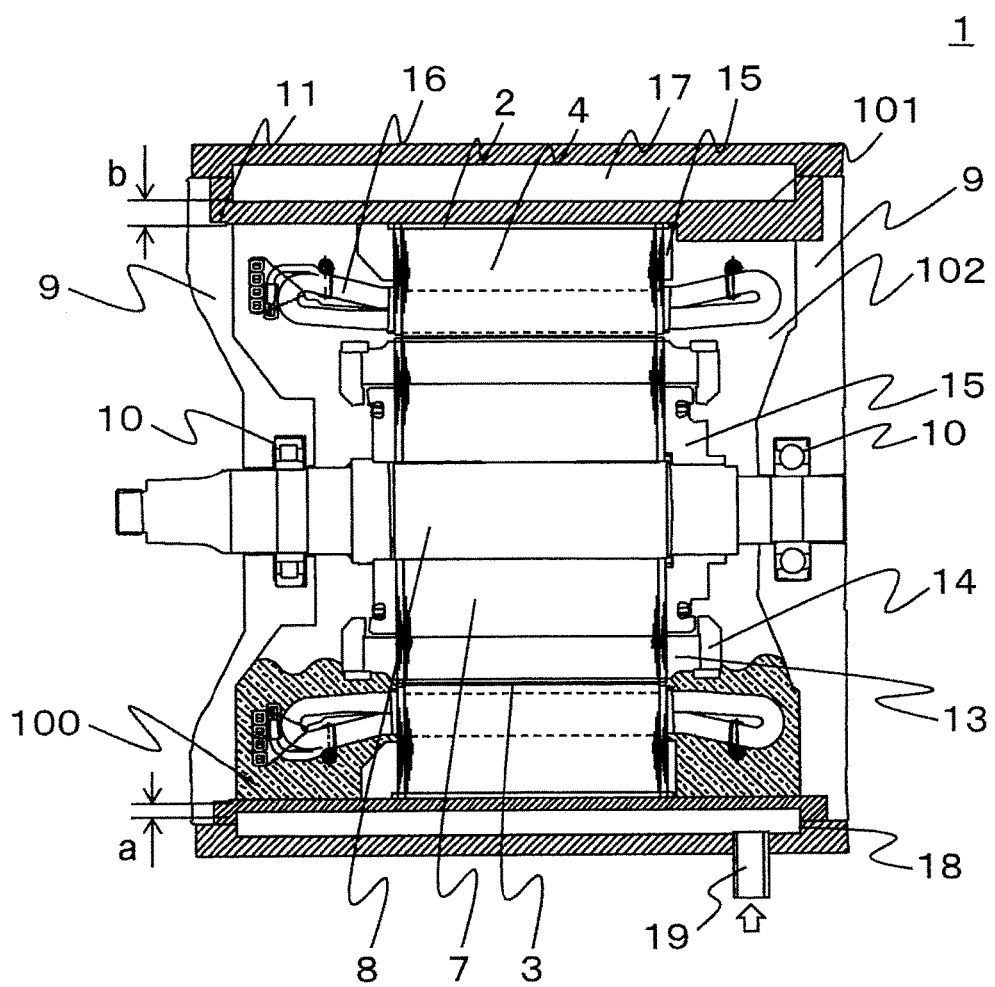
FIG. 9 is a sectional view in the axial direction of a rotating electric machine of the embodiment 8 of the present invention.

FIG. 9 is a sectional view in the axial direction of the rotating electric machine 1 of the present embodiment. Here, the point different from FIG. 1 is that the thickness a of the housing 11 cooling the liquid coolant 100 and the stator core 4 is configured to be smaller than the thickness b of the housing 11 cooling the gas coolant 102 and the stator core 4.

According to the present embodiment, by reducing the thickness a of the housing 11 cooling the liquid coolant 100 and the stator core 4, the effect of cooling the liquid coolant 100 and the stator core 4 by the liquid coolant 101 is enhanced. Thus, cooling of the inside of the rotating electric machine 1 can be strengthened, and therefore the rotating electric machine 1 can be miniaturized.

Although each embodiment of the present invention has been described above, each embodiment described above is only an embodiment in implementing the present invention, and, with respect to the configuration of the rotating electric machine related to each embodiment described above, it is possible to replace a part thereof with other configuration, to delete a part thereof, and to add other configuration within a range not departing from the scope of the present invention. Also, it is needless to mention that the configuration of the rotating electric machine obtained by such replacement, deletion and addition is also included in the technical range of the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotating electric machine comprising:
   a housing;
   a stator having a stator core and stator coils wound around the stator core;
   a rotor, having a stator core rotatably held around a rotation axis, disposed so as to oppose the stator through a gap;
   a flow passage through which the first liquid coolant circulates;
   a flow inlet connected to one end of the flow passage so as to make the first liquid coolant flow from the outside into the flow passage;
   a flow outlet connected to the other end of the flow passage so as to make the first liquid coolant having flown through the flow passage flow to the outside; and
   a cooling frame disposed on an outer circumference side of the housing;
   wherein a second liquid coolant and a gas coolant are sealed in a space comprised of the housing and an end bracket;
   wherein the flow inlet is provided at a height substantially equal to a height of an interface between the second liquid coolant and the gas coolant; and
   wherein the rotating electric machine is configured such that the entirety in the length direction of the flow passage is divided into a first zone portion closer to the flow inlet and a second zone portion closer to the flow outlet, the first zone portion becomes a portion where the first liquid coolant mainly cools the second liquid coolant, and the second zone portion becomes a portion where the first liquid coolant mainly cools the gas coolant.

2. The rotating electric machine according to claim 1, wherein
   the direction of the flow passage for the first liquid coolant of the cooling frame is generally parallel to the rotation axis of the rotating electric machine.

3. The rotating electric machine according to claim 2, wherein
   a flow passage portion of the cooling frame is disposed in the contact surface of the outer circumference surface of the stator core and the cooling frame.

4. The rotating electric machine according to claim 3, wherein
   the interval of a flow passage wall of a flow passage portion of the cooling frame cooling the second liquid coolant is narrower than the interval of a flow passage wall of a flow passage portion where gas coolant inside the machine is cooled.

5. The rotating electric machine according to claim 2, wherein
   the cooling frame comprises fins in the inside of a flow passage portion of the first liquid coolant that cools the second liquid coolant.

6. The rotating electric machine according to claim 2, wherein
   the cooling frame comprises two pieces or more of the flow passage from the flow inlet to the flow outlet.

7. The rotating electric machine according to claim 2, wherein
   a reservoir for the second liquid coolant is formed on the outer circumference side of the cooling frame.

8. The rotating electric machine according to claim 2, wherein
   the length in the axial direction of a flow passage portion cooling the second liquid coolant of the cooling frame is longer than the length in the axial direction of the stator core.

9. The rotating electric machine according to claim 2, wherein
   the frame thickness (a) on the inside diameter side of a flow passage portion of the first liquid coolant cooling the second liquid coolant of the cooling frame is thinner than the frame thickness (b) on the inside diameter side of a flow passage portion of the first liquid coolant cooling gas coolant of the cooling frame.

10. The rotating electric machine according to claim 1, wherein
    the direction of the flow passage for the first liquid coolant of the cooling frame is generally parallel to the outer circumference direction of the rotating electric machine.

11. The rotating electric machine according to claim 10, wherein
    a flow passage portion of the cooling frame is disposed in the contact surface of the outer circumference surface of the stator core and the cooling frame.

12. The rotating electric machine according to claim 11, wherein
    the interval of a flow passage wall of a flow passage portion of the cooling frame cooling the second liquid coolant is narrower than the interval of a flow passage wall of a flow passage portion where gas coolant inside the machine is cooled.

13. The rotating electric machine according to claim 10, wherein
    the cooling frame comprises fins in the inside of a flow passage portion of the first liquid coolant that cools the second liquid coolant.

14. The rotating electric machine according to claim 10, wherein
    the cooling frame comprises two pieces or more of the flow passage from the flow inlet to the flow outlet.

15. The rotating electric machine according to claim 10, wherein
    a reservoir for the second liquid coolant is formed on the outer circumference side of the cooling frame.

16. The rotating electric machine according to claim 10, wherein
    the length in the axial direction of a flow passage portion cooling the second liquid coolant of the cooling frame is longer than the length in the axial direction of the stator.

17. The rotating electric machine according to claim 10, wherein
    the frame thickness (a) on the inside diameter side of a flow passage portion of the first liquid coolant cooling the second liquid coolant of the cooling frame is thinner than the frame thickness (b) on the inside diameter side of a flow passage portion of the first liquid coolant cooling gas coolant of the cooling frame.

\* \* \* \* \*